June 30, 1959  B. F. BOWER  2,892,655
FRANKFURTER TONGS
Filed Nov. 25, 1957
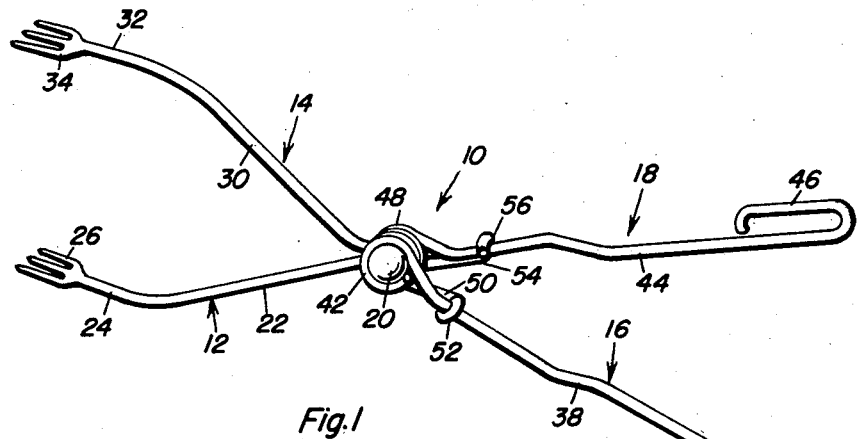
Fig. 1
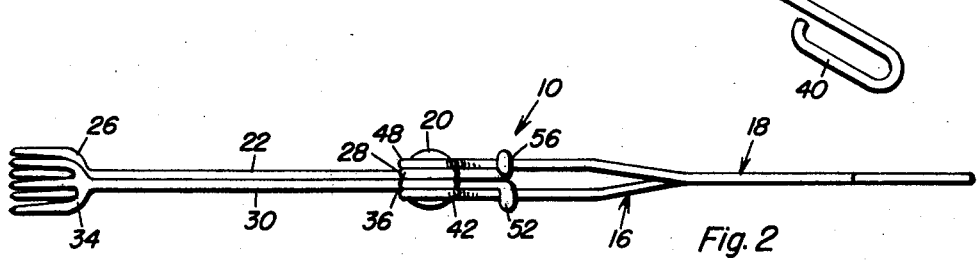
Fig. 2
Fig. 4
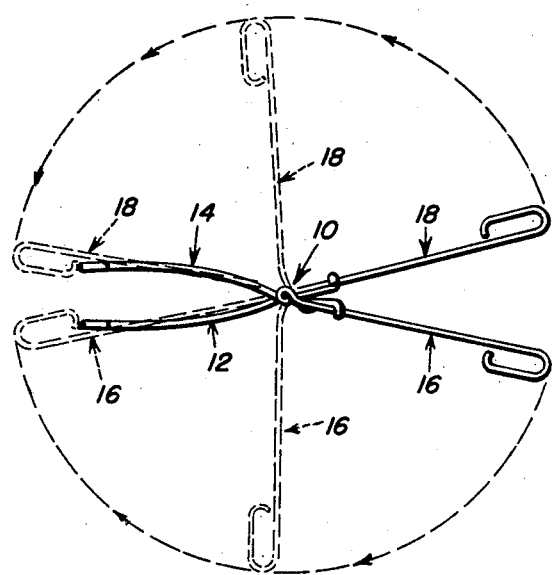
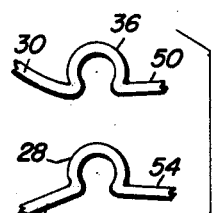
Fig. 3
Benjamin F. Bower
INVENTOR.

United States Patent Office 2,892,655
Patented June 30, 1959

2,892,655

FRANKFURTER TONGS

Benjamin F. Bower, Indianapolis, Ind.

Application November 25, 1957, Serial No. 698,537

5 Claims. (Cl. 294—106)

This invention relates in general to new and useful improvements in cooking utensils, and more specifically to improved frankfurter tongs.

Tongs which are designed for roasting frankfurters and the like over an open fire are relatively long. On an average the tongs are approximately 24 inches long in order that the hand of the holder of the tongs will not be burned or overheated from the open fire during the franfurter roasting operation. It can be well appreciated that tongs which are 24 inches long cannot be readily stored and thus occupy desirable space. Furthermore, the carrying of such tongs is unwieldy.

It is therefore the primary object of this invention to provide tongs for handling frankfurters and the like, the tongs being so constructed whereby they will fold up so that the overall length of the tongs in the folded state is approximately one-half the length thereof when in use.

Another object of this invention is to provide improved tongs for handling frankfurters and the like, the tongs including tong members and handles, the handles and tong members being individually pivotally mounted and releasably connected together whereby the handles may be pivoted into positions substantially coaxial with the tong members.

A further object of this invention is to provide improved tongs for handling frankfurters and the like, the tongs including a pair of tong members which are pivotally mounted on a pivot bolt, a pair of handles which are also pivotally mounted on the pivot bolt for pivoting independently of the tong members whereby the handles may be disposed generally coaxial with the tong members, and means on the tong members in the form of extensions releasably interlocked with the handles whereby the handles may be selectively used to operate the tong members or swung to stored positions coaxial with the tong members.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the tongs which is the subject of this invention, the tongs being shown in open position;

Figure 2 is a top plan view of the tongs and shows the manner in which the tong members and handles are pivotally mounted on the pivot bolt;

Figure 3 is an enlarged fragmentary exploded perspective view of the tong members in the vicinity of the pivot bolt showing the details of construction thereof; and Figure 4 is a reduced schematic view showing the manner in which the handles may be swung into positions generally coaxial with the tong members whereby the tongs may be folded into a relatively compact state.

Referring now to the drawings in detail, it will be seen that there is illustrated the tongs which is the subject of this invention, the tongs being referred to in general by the reference numeral 10. The tongs 10 include a pair of tong members 12 and 14 and a pair of handles 16 and 18. The tong members 12 and 14 and the handles 16 and 18 are pivotally mounted on a pivot bolt 20.

The tong member 12 is disposed lowermost and includes downwardly extending shank portion 22 which terminates at the forward end thereof in a straight forward shank portion 24. The forward straight shank portion 24 terminates in a fork portion 26. The rear part of the shank 22 is provided with a loop 28, as is best shown in Figure 3. The loop 28 receives an intermediate portion of the pivot bolt 20.

The tong member 14 is very similar to the tong member 12 and differs therefrom in that it is provided with a shank 30 which extends upwardly and terminates in a forward straight shank portion 32 which in turn terminates in a fork 34. The rear part of the shank portion 30 terminates in a loop 36 which is best shown in Figure 3.

The handle 16 includes a downwardly extending shank portion 38 which terminates at the rear end thereof in a grip portion 40 and at the forward end thereof in a loop 42, the loop 42 receiving an outer part of the pivot bolt 20.

The handle 18 includes a shank portion 44 which is elongated and which extends upwardly. The handle portion 44 terminates at the rear end thereof in a grip portion 46. The forward end of the shank portion 44 terminates in a loop 48 through which there is received the pivot bolt 20.

From the foregoing description of the tong members 12 and 14 and the handles 16 and 18, it will be seen that the loops of the tong members and the handles are arranged so that the loop 42, the loop portion 36, the loop portion 28 and the loop 48 are disposed in that order.

The tong member 14 terminates in a rearwardly disposed extension 50 which is integrally connected to the loop portion 36, as is best shown in Figure 3. The extension 50 terminates in a hook 52 which is releasably engaged with the shank 38 thus releasably connecting the handle 16 to the tong member 14.

Like the tong member 14, the tong member 12 is provided with an extension, the extension being referred to by the reference numeral 54. The extension 54, as is best shown in Figure 3, is formed integral with the loop portion 28 and terminates in a hook 56 which releasably interlocks the handle 18 with the tong member 12. When the hooks 52 and 56 are interlocked with the shanks 38 and 44, respectively, the tongs 10 will function in the normal manner. However, when it is desired to transport or store the tongs 10, the overall size thereof may be greatly reduced by disengaging the shanks 38 and 44 from the hooks 52 and 56, respectively, thus freeing the handles 16 and 18 for swinging movement into positions generally coaxial with the tong members 12 and 14, respectively, as is best shown in Figure 4. Thus the overall size of the tongs 10 may be greatly reduced.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Tongs for frankfurters and the like, said tongs including a pair of tong members, a pivot bolt, means pivotally mounting said tong members on said pivot bolt, a pair of handles, means pivotally mounting said handles on said pivot bolt for pivoting independently of said tong members whereby said handles may be pivoted into stored positions coextensive with said tong members, and means releasably interlocking each one of said handles with one of said tong members.

2. Tongs for frankfurters and the like, said tongs including a pair of tong members, a pivot bolt, means pivotally mounting said tong members on said pivot bolt, a pair of handles, means pivotally mounting said handles on said pivot bolt for pivoting independently of said tong members whereby said handles may be pivoted into stored positions coextensive with said tong members, and means releasably interlocking each one of said handles with one of said tong members, each of said pivot means being in the form of loops receiving said pivot bolt, said loops being disposed in side-by-side relation.

3. Tongs for frankfurters and the like, said tongs including a pair of tong members, a pivot bolt, means pivotally mounting said tong members on said pivot bolt, a pair of handles, means pivotally mounting said handles on said pivot bolt for pivoting independently of said tong members whereby said handles may be pivoted into stored positions coextensive with said tong members, and means releasably interlocking each one of said handles with one of said tong members, said last mentioned means being in the form of extensions on said tong members.

4. Tongs for frankfurters and the like, said tongs including a pair of tong members, a pivot bolt, means pivotally mounting said tong members on said pivot bolt, a pair of handles, means pivotally mounting said handles on said pivot bolt for pivoting independently of said tong members whereby said handles may be pivoted into stored positions coextensive with said tong members, and means releasably interlocking each one of said handles with one of said tong members, each of said pivot means being in the form of loops receiving said pivot bolt, said loops being disposed in side-by-side relation, said last mentioned means being in the form of extensions on said tong members.

5. Tongs for frankfurters and the like, said tongs including a pair of tong members, a pivot bolt, means pivotally mounting said tong members on said pivot bolt, a pair of handles, means pivotally mounting said handles on said pivot bolt for pivoting independently of said tong members whereby said handles may be pivoted into stored positions coextensive with said tong members, and means releasably interlocking each one of said handles with one of said tong members, each of said tong members terminating in a fork remote from said pivot pin.

References Cited in the file of this patent
UNITED STATES PATENTS

| | | |
|---|---|---|
| 1,245,162 | Pietz | Nov. 6, 1917 |
| 1,787,331 | Wilson | Dec. 30, 1930 |
| 2,486,496 | Romazon | Nov. 1, 1949 |
| 2,609,228 | Bair | Sept. 2, 1952 |